United States Patent
Bowers

(10) Patent No.: US 7,159,473 B1
(45) Date of Patent: Jan. 9, 2007

(54) INTERNAL TUBE SUPPORT FOR FLOW ELEMENTS PROVIDING FOR TUBE EXPANSION WITHIN THE FLOW ELEMENT SHELL

(76) Inventor: James R. Bowers, 1453 Mars Ave., Lakewood, OH (US) 44107

( * ) Notice: Subject to any disclaimer, the term of this patent is extended or adjusted under 35 U.S.C. 154(b) by 81 days.

(21) Appl. No.: 11/267,804

(22) Filed: Nov. 7, 2005

(51) Int. Cl.
*G01F 1/46* (2006.01)
*G01D 21/00* (2006.01)

(52) U.S. Cl. .................... 73/861.65; 73/866.5
(58) Field of Classification Search ............ None
See application file for complete search history.

(56) References Cited

U.S. PATENT DOCUMENTS

| | | | |
|---|---|---|---|
| 5,036,711 A | * | 8/1991 | Good ............ 73/861.66 |
| 5,736,651 A | | 4/1998 | Bowers ............ 73/861.66 |
| 6,289,745 B1 | | 9/2001 | Bowers ............ 73/861.66 |
| 6,401,555 B1 | | 6/2002 | Bowers ............ 73/866.5 |

* cited by examiner

*Primary Examiner*—Harshad Patel
(74) *Attorney, Agent, or Firm*—John D. Gugliotta

(57) ABSTRACT

A tube mounting assembly for total traverse or static traverse sensing tubes is provided for use with Pitot tube devices where the tubes are allowed to expand and contract independent of the flow element shell. A female threaded pipe cap is tack welded or otherwise affixed to the inside internal surface of the flow element shell. A ½ inch NPTX tube fitting of the bore-thru fitting type is affixed to the pipe cap, and a traverse tube, sealed by high temperature packing or thread sealant between the tube and a tube nut, are then affixed to the opposite end of the bore-thru tube fitting.

6 Claims, 3 Drawing Sheets

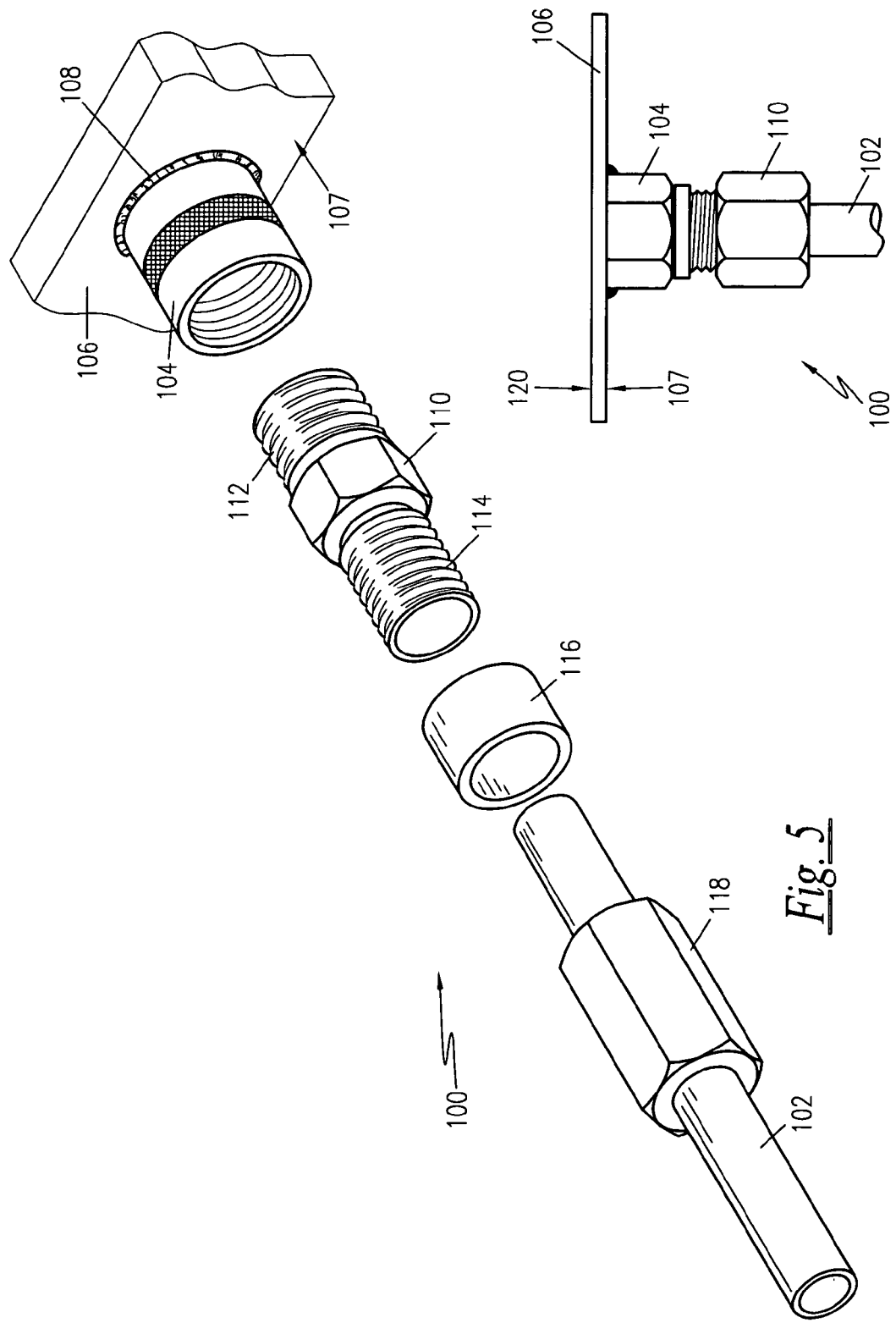

INTERNAL TUBE SUPPORT FOR FLOW ELEMENTS PROVIDING FOR TUBE EXPANSION WITHIN THE FLOW ELEMENT SHELL

RELATED APPLICATIONS

There are no previously filed, nor currently any co-pending applications, anywhere in the world.

BACKGROUND OF THE INVENTION

1. Field of the Invention

The present invention relates to Pitot Array Flow Elements wherein the tubes are of a different material than the housing or shell of the flow element. In such an arrangement, the present invention provides for the differential expansion between the tube expansion and the shell or housing expansion. Further, the present invention provides for the movement of the tubes within the packing assembly without penetrating the shell or housing of the flow element.

2. Description of the Related Art

The Pitot tube operates based upon the principal that when a fixed probe is inserted into piping or duct work containing a moving fluid, the total pressure sensed by the probe is the sum of the static pressure exerted by the fluid, whether in motion or at rest, and the dynamic pressure equivalent to the kinetic energy of the fluid in motion. Conventional Pitot tube arrangements provide measurement of both the static and total pressure of the flowing fluid, the difference between which is the dynamic pressure. This differential pressure, i.e. the dynamic pressure, is directly related to and can be used to calculate the linear flow rate within the piping or duct work. The volumetric flow rate of the fluid is determined by multiplying the linear flow rate by the cross-sectional area of the conduit.

Recent advances in the development of high temperature gas flow sensing elements are known. Particularly, in U.S. Pat. No. 5,736,651, issued to the present applicant, and incorporated herein by reference as if fully rewritten, a high temperature gas flow sensing element was first described using a ribbon packing or packing ring comprised of GRAPHOIL™ packing material, as manufactured by U-CAR™, or similar and equivalent material. Such a packing remains pliable to seal around Pitot tubes while still permitting lateral motion of the Pitot tubes which is encountered when thermal differential expansion occurs. Such an innovation solves the particular problem of leakage between the sensing tube ends where they are connected at the sensing element head and the duct sidewall that these tubes must penetrate.

However, such a solution is applicable only where the traverse tubes of the flow element penetrate the shell, but is not achievable in situations where connections outside the flow element are not possible due to physical constraints (such as where two or more air flow ducts are physically butted against each other). Up until now, no acceptable solution has existed in such applications.

Consequently, a need exists to provide an improved assembly for air flow elements used with high temperature flow elements where the tubes are allowed to expand and contract independent of the flow element shell when no shell penetration of the tubes can exist.

SUMMARY OF THE INVENTION

It is therefore an object of the present invention to provide an improved tube mounting assembly for air flow elements.

It is a feature of the present invention to provide an improved tube mounting assembly for air flow elements used with high temperature flow elements where the tubes are allowed to expand and contract independent of the flow element shell when no shell penetration of the tubes can exist.

Briefly described according to one embodiment of the present invention, air flow sensing element tubes are affixed to an element shell by an internal tube support arrangement. A female threaded pipe cap is tack welded or otherwise affixed to the inside internal surface of the flow element shell. A ½ inch NPTX tube fitting of the bore-thru fitting type is affixed to the pipe cap, and a traverse tube, sealed by high temperature packing or thread sealant between the tube and a tube nut, are then affixed to the opposite end of the bore-thru tube fitting.

The traverse tube itself must be shorter than normal so that it does not penetrate the element shell, but such a tube fitting/head connection is utilized for high temperature applications where the traverse tubes cannot penetrate the element shell because of space limitations on the outside surface of the element shell.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is an exploded perspective view of a tube mounting assembly for air flow elements showing an internal tube support arrangement according to the preferred embodiment of the present invention; and FIG. 6 is a side elevational view thereof.

DESCRIPTION OF THE PREFERRED EMBODIMENTS

Figure 1:
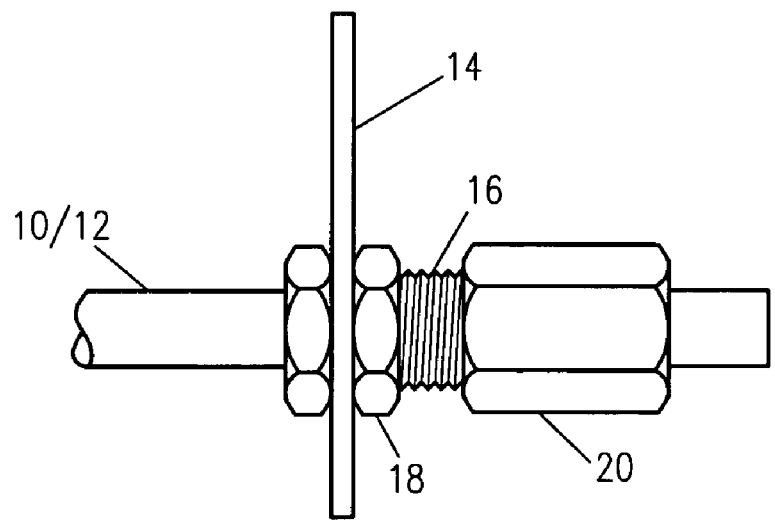
FIG. 1 is a detailed view of one embodiment of a tube shell penetration according to the PRIOR ART.
Figure 2:
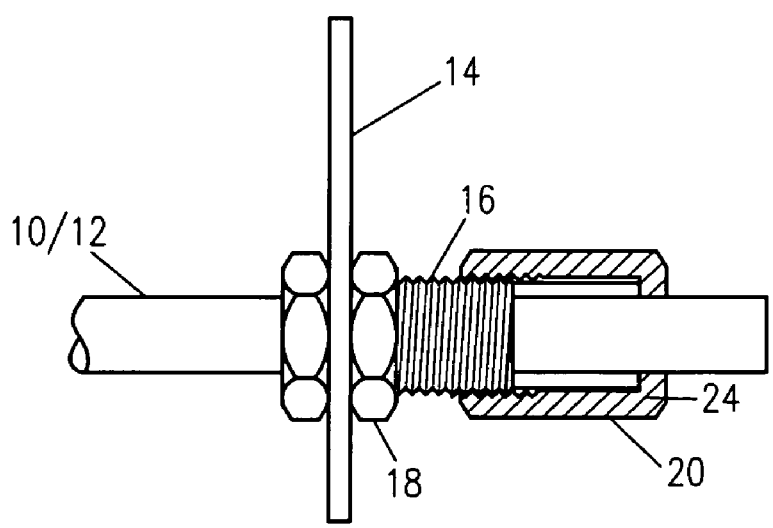
FIG. 2 is a detailed view of an alternate embodiment of a tube shell penetration according to the PRIOR ART.

In order to describe the complete relationship of the invention, it is essential that some description be given to the manner and practice of functional utility and description of a typical tube shell penetration is disclosed according to the PRIOR ART. As shown in FIGS. 1–4, previous improvements have been made specifically for use with a Pitot tube array application. In such applications, the total pressure sensing tube 10 and static pressure sensing tube 12 are affixed to the housing 14 in a similar manner utilizing a ferrule 16 encircling the tube 10.12 and compressed against a fitting 18 by a nut 20. Similarly, the opposite end of the sensing tube 10/12 can be affixed utilizing compression tube fittings. With total pressure tubes 10 and static pressure sensing tubes 12 affixed at both ends, one end at the housing as shown in FIG. 1 and the other end at the total pressure manifold or static pressure manifold, the tubes comprising each array are, in essence, "locked" in place. If various materials, such as differing grades of steel or stainless steel are utilized, differing expansion rates result upon heating or cooling. Such a condition can result in material stress and fatigue related leakage or failure, especially catastrophic seal failure, upon such high gradient temperature cycling. Also, the use of conventional ferrules 16 "lock" onto the tubing, thereby preventing the movement necessarily resulting from thermal differential expansion. Therefor, a particular improvement is embodied as shown in FIG. 2, wherein a high-temperature tubing connection for a shell penetration, generally noted as 20, is shown. As is shown, a high temperature packing replaces the ferrule 16. It is envisioned that a ribbon packing or packing ring made of any pliable material resistant to high temperatures can be utilized for this packing 24. A GRAPHOIL™ packing material, as manufactured by U-CAR™, or similar and equivalent material has been found to be successful in permanently "sealing" the tube 10 or 12 between the nut 20 and the fitting 18, thereby assuring a high pressure seal such that the housing 14 retains its integrity and remains leak-free even under conditions of extreme temperature or extreme temperature gradient cycling. Such a high temperature packing remains pliable to seal around the tubes 10 or 12, while still permitting lateral motion of the traverse tubes which is encountered when thermal differential expansion occurs. It is envisioned that such an improvement need be utilized at least one end of the sensing tube in order to prevent the stress damaged mentioned above.

Figure 3:
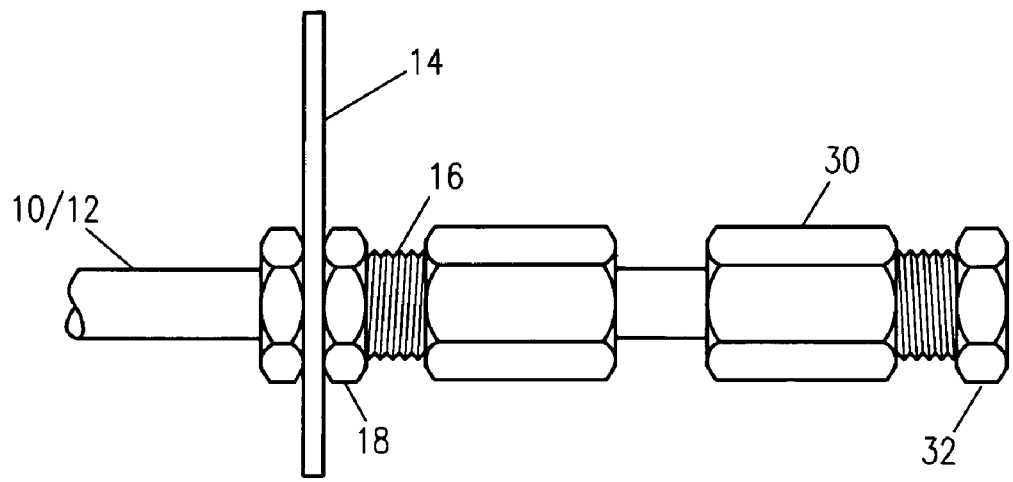
FIG. 3 is a detailed view of a traverse tube termination according to the PRIOR ART.

Also, in FIG. 3, an exterior array access port is shown in greater detail, having an annular cap fitting 30 terminating the end of the tube, 10 or 12, and housing a plug fitting 32 for plugging the port thereby created. Such access ports are useful for inspection or cleaning of the array tube interiors should debris accumulate in heavy particulate-laden applications. The cap fitting 30 with plug fitting 32 extend outward from the housing by a sufficient length should any brushing or purging of the tubes be required. Further, an additional embodiment of the array access port as depicted in FIG. 3 could be adaptable for use with either tube shell penetration as shown in FIG. 1 and FIG. 2.

Figure 4:
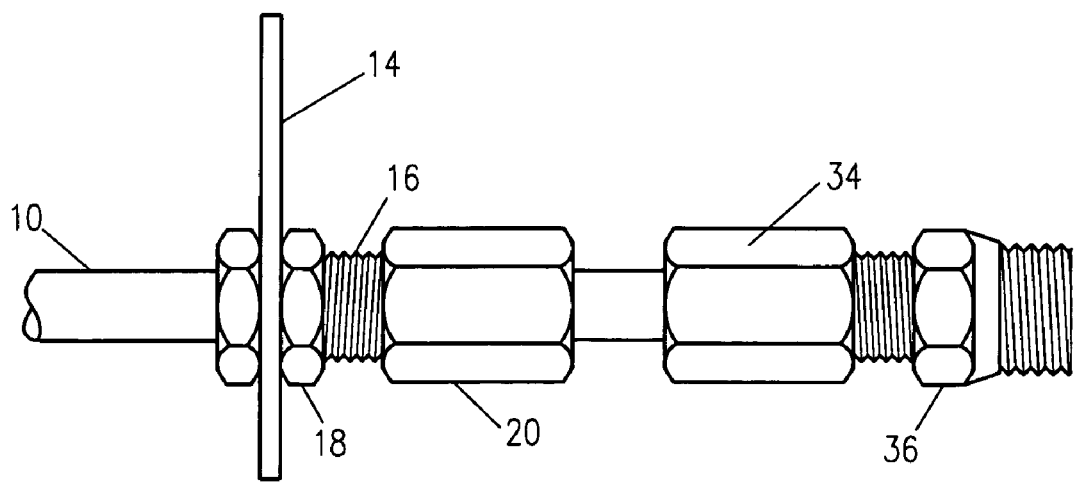
FIG. 4 is a detailed view of a signal tube termination according to the PRIOR ART.

Finally, in FIG. 4 a typical signal tube termination as embodied by an instrument tap is shown with a cap compression fitting 34 for mounting and containing a coupling 36 allows connection of the respective instrument tap to a differential pressure instrument for indicating flow rate and/or transmitting a flow rate signal. It is envisioned that the signal tube termination as depicted in FIG. 4 could be adaptable for use with either tube shell penetration as shown in FIG. 1 and FIG. 2. However, in the currently envisioned application, such a method is a maintenance and servicing impediment, and can result in additional problems, especially at high temperatures.

The best mode for carrying out the invention is presented in terms of its preferred embodiment, herein depicted within the FIGS. 5–6.

1. Detailed Description of the Figures

Referring now to FIGS. 5–6, a tube mounting assembly for air flow elements showing an internal tube support arrangement, generally noted as 100, is shown according to the preferred embodiment of the present invention for internal support of a traverse tube 102. An internal tube support shell connection 104, shown as a female threaded pipe cap connected to the element shell 106 by a weld attachment 108 such as a tack weld or other similar method of affixing the connection 104 to the inside internal surface 107 of the flow element shell 106. A threaded coupling 110, shown herein as a ½ inch NPTX tube fitting of the bore-thru fitting type, is threadingly engaged at a first end 112 to the shell connection 104. The traverse tube 102, sealed by high temperature packing 116 or thread sealant between a second end 114 and a tube nut 118, are then affixed to the opposite end of the bore-thru tube fitting. It is envisioned that a ribbon packing or packing ring made of any pliable material resistant to high temperatures can be utilized for this packing 24. A GRAPHOIL™ packing material, as manufactured by U-CAR™, or similar and equivalent material has been found to be successful in permanently "sealing" the tube 102 between the nut 118 and the fitting 110, thereby assuring a high pressure seal such that the internal tube support arrangement 100 retains its integrity and remains leak-free even under conditions of extreme temperature or extreme temperature gradient cycling. Such a high temperature packing remains pliable to seal around the tubes 102, while still permitting lateral motion of the traverse tubes which is encountered when thermal differential expansion occurs.

The traverse tube 102 itself must be shorter than normal so that it does not penetrate the element shell, but such a tube mounting assembly is utilized for high temperature applications where the traverse tubes cannot penetrate the element shell 106 because of space limitations on the outside surface 120 of the element shell 106.

2. Operation of the Preferred Embodiment

To use the present invention, the internal tube support shell connection 104 is affixed to the internal surface 107 of the element shell 106. The tube nut 118 is then placed on the traverse tube 102, and high temperature packing 116 is installed onto the end of the traverse tube 102. The coupling 110 is then hand-tightened to both the internal tube support shell connection 104 and the tube nut 118, and this process is repeated for every traverse tube 102 required in an element or element array. After all the necessary tubes are in place, final tightening of the tube nut 118 can be accomplished as normal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. In a total traverse or static traverse sensing tubes for use with Pitot tube devices, wherein the improvement comprises:

means for attachment of said sensing tube to an internal surface of an element shell such that said tubes is allowed to expand and contract independent of the flow element shell;

an internal tube support shell connection attached to said internal surface;

coupling means for affixing said sensing tube to said internal tube support shell connection; and high temperature packing for sealing between said coupling means and said sensing tube;

wherein said internal tube support shell connection comprises a female threaded pipe cap tack welded to said element shell internal surface.

2. In a total traverse or static traverse sensing tubes for use with Pitot tube devices, wherein the improvement comprises:
   means for attachment of said sensing tube to an internal surface of an element shell such that said tubes is allowed to expand and contract independent of the flow element shell;
   an internal tube support shell connection attached to said internal surface;
   coupling means for affixing said sensing tube to said internal tube support shell connection; and
   high temperature packing for sealing between said coupling means and said sensing tube;
   wherein said coupling means comprises a male-to-male NPTX bore-thru tube fitting.

3. In a total traverse or static traverse sensing tubes for use with Pitot tube devices, wherein the improvement comprises:
   means for attachment of said sensing tube to an internal surface of an element shell such that said tubes is allowed to expand and contract independent of the flow element shell;
   an internal tube support shell connection attached to said internal surface;
   coupling means for affixing said sensing tube to said internal tube support shell connection; and
   high temperature packing for sealing between said coupling means and said sensing tube;
   wherein said high temperature packing comprises GRAPHOIL™ packing material, as manufactured by U-CAR™, or similar and equivalent material.

4. An air flow sensing element comprising:
   an element shell having an internal surface opposite an external surface;
   an internal tube support shell connection affixed to said internal surface;
   a Pitot sensing tube;
   coupling means for affixing said sensing tube to said internal tube support shell connection; and
   high temperature packing for sealing between said coupling means and said sensing tube;
   wherein said internal tube support shell connection comprises a female threaded pipe cap tack welded to said element shell internal surface.

5. An air flow sensing element comprising:
   an element shell having an internal surface opposite an external surface;
   an internal tube support shell connection affixed to said internal surface;
   a Pitot sensing tube;
   coupling means for affixing said sensing tube to said internal tube support shell connection; and
   high temperature packing for sealing between said coupling means and said sensing tube;
   wherein said coupling means comprises a male-to-male NPTX bore-thru tube fitting.

6. An air flow sensing element comprising:
   an element shell having an internal surface opposite an external surface;
   an internal tube support shell connection affixed to said internal surface;
   a Pitot sensing tube;
   coupling means for affixing said sensing tube to said internal tube support shell connection; and
   high temperature packing for sealing between said coupling means and said sensing tube;
   wherein said high temperature packing comprises GRAPHOIL™ packing material, as manufactured by U-CAR™, or similar and equivalent material.

* * * * *